United States Patent [19]

Lank et al.

[11] 3,781,886
[45] Dec. 25, 1973

[54] MULTIPLE-TARGET RESOLUTION IN THE MAIN BEAM OF A CONICAL SCAN RADAR

[75] Inventors: Gerald W. Lank; Gerald E. Pollon, both of Claremont, Calif.

[73] Assignee: Technology Service Corporation, Santa Monica, Calif.

[22] Filed: May 22, 1972

[21] Appl. No.: 255,520

[52] U.S. Cl. ............................................. 343/7.4
[51] Int. Cl. ............................................. G01s 9/02
[58] Field of Search ............................... 343/7.4

[56] References Cited
UNITED STATES PATENTS
3,697,992  10/1972  Kleptz .......................... 343/7.4 X Primary Examiner—Malcolm F. Hubler
Attorney—Samuel Lindenberg et al.

[57] ABSTRACT

A method is disclosed for target ray resolution in coherent, conically scanned radar when a target image is present. An envelope detector and frequency discriminator operate on the IF signal. The fundamental and second harmonic components of the conical scan out of the discriminator are used in a computer along with the DC, fundamental, and second harmonic of the envelope out of the detector to solve five equations in five unknowns. That yields the elevation angles to the target and its image. The larger of the two angles is selected as the elevation angle to the target. The first harmonic and the DC component of the envelope are employed to produce an estimate of the target azimuth angle.

10 Claims, 9 Drawing Figures

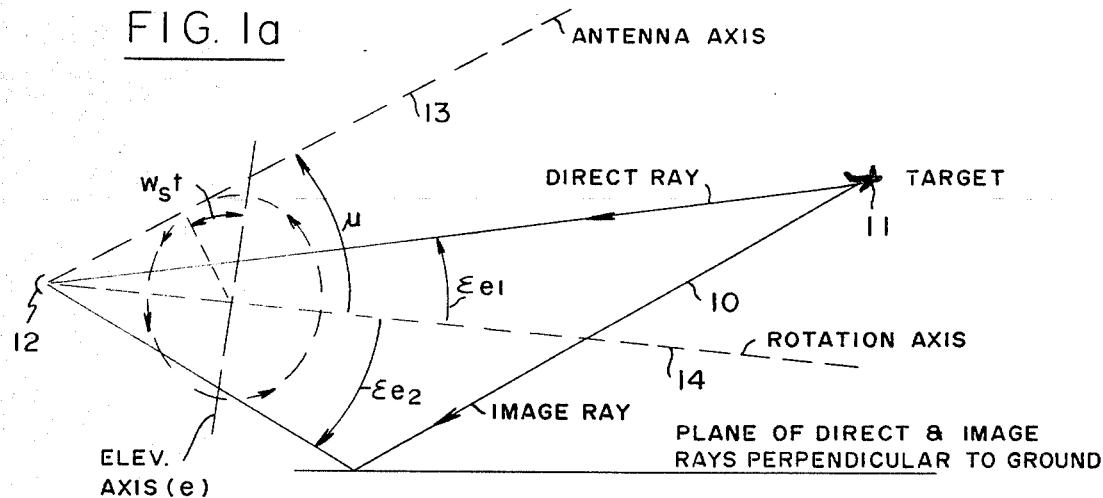
FIG. 1a
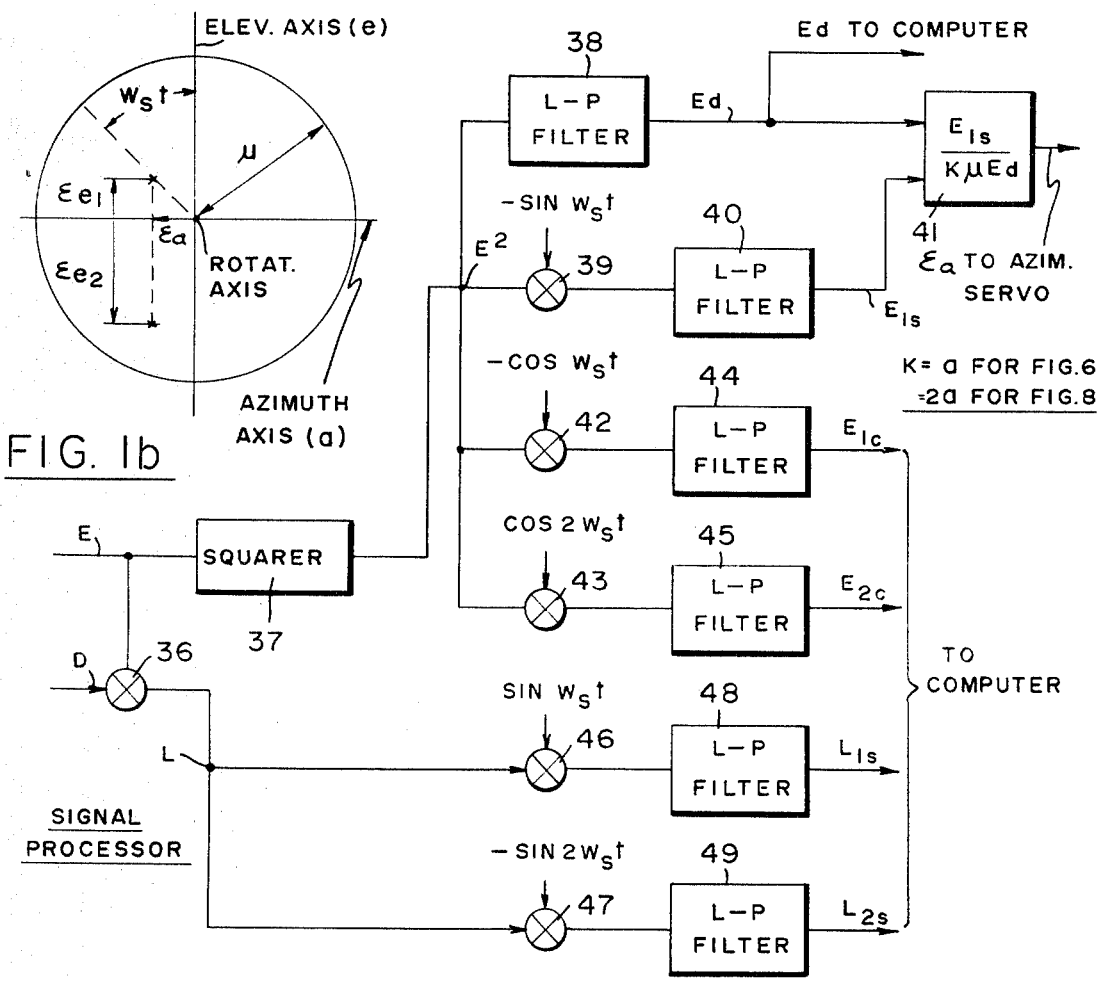
FIG. 1b
FIG. 7

TARGET-IMAGE SEPARATION = 1°
ANTENNA REFERENCE AXIS POINTED AT TARGET $\theta_B = 1.6°$; $\mu_0 = 0.75°$ TARGET-IMAGE SEPARATION = 1°
$(\mu)$ SQUINT ANGLE = 1.3°
$\theta_B = 1.6°$; $\mu_0 = .75°$

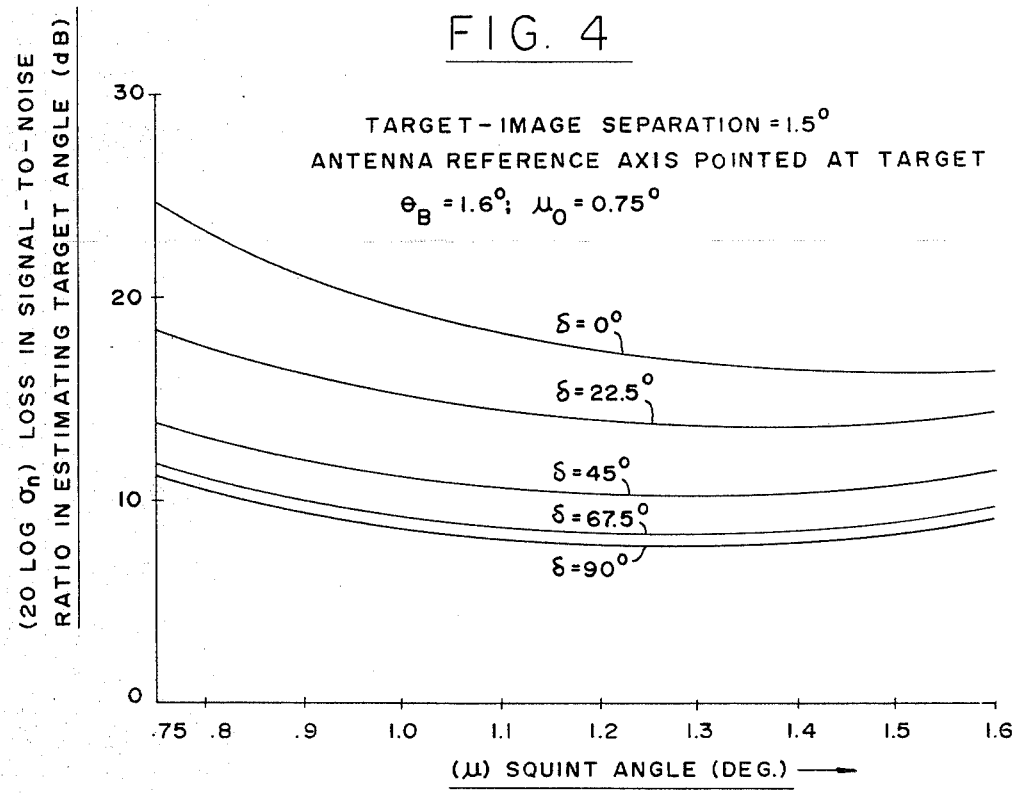
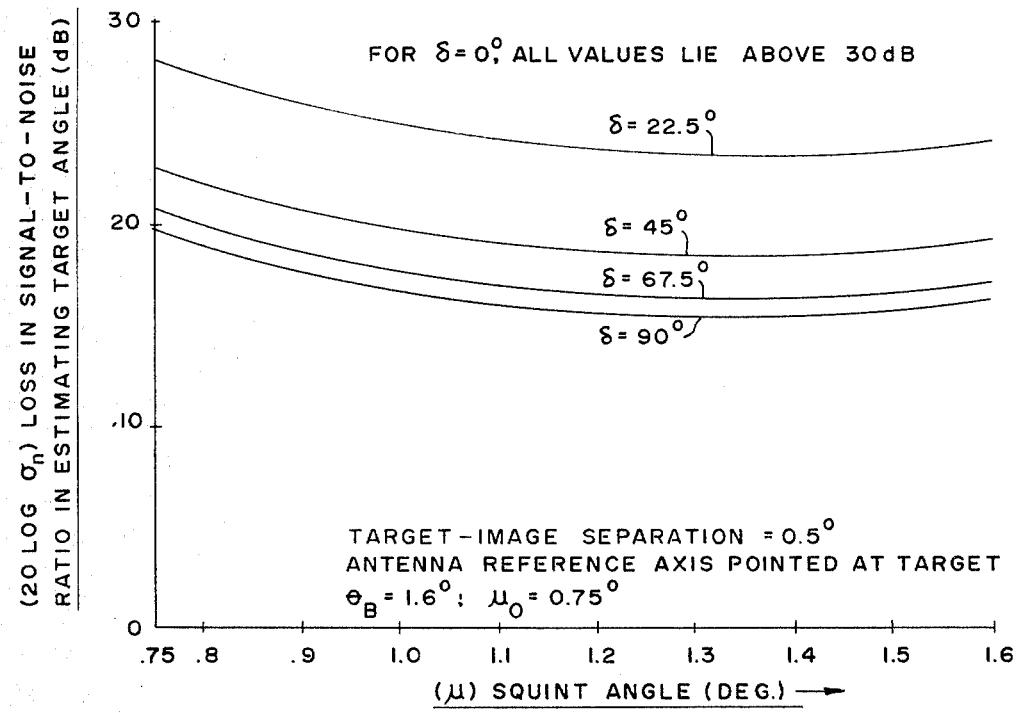

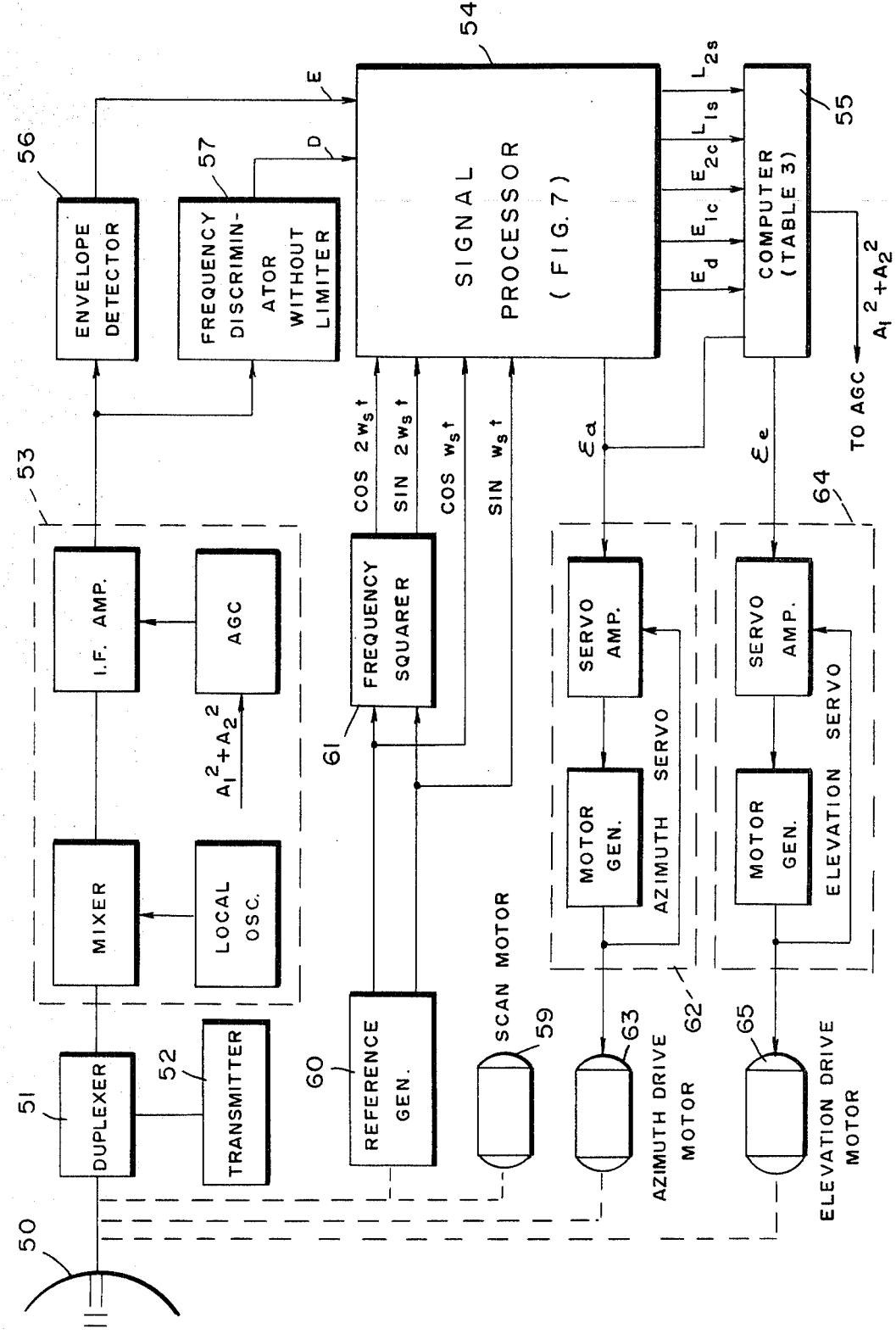

MULTIPLE-TARGET RESOLUTION IN THE MAIN BEAM OF A CONICAL SCAN RADAR

BACKGROUND OF THE INVENTION

This invention relates to coherent, conically scanned radar, and more particularly to a method for target resolution with a target image present.

A low-flying target may cause echoes to be returned both directly and as an image due to reflections from the ground. These reflections are referred to hereinafter as an image rays. When an image ray is present in the main beam, it can interfere with tracking.

Considering the case where a coherent radar has a conically scanning antenna of either the rotating asymmetrical dipole type or the mutating feed type, the return of the target and the image ray can be modeled as independent of the scanning characteristic on transmission, as when transmission is from a different antenna than that used to receive the return of the target. If the Cramer-Rao bound for the minimum variance, unbiased estimate of the elevation angle to the target would be plotted for the case where the antenna has a Gaussian pattern, the plots would show a loss in angle estimation accuracy as compared to the case where there is no image present. For high signal-to-noise ratio, a maximum likelihood processor will achieve the Cramer-Rao bound, and for sufficiently high signal-to-noise ratio, the Cramer-Rao bound is the greatest lower bound. However, it is desirable to use more conventional processing.

A conventional conical scan radar system can estimate the elevation angle to the target by using the modulation (envelope) of the IF signal due to scanning. The componenet of the envelope at the conical scan frequency is normalized by the component of the envelope at DC in order to obtain the angle estimate. If two targets are present in the main beam — the target to be tracked and its ground reflected image — this procedure leads to "glinting" of the angle estimate, and poor accuracy in elevation angle estimation of the target generally results. However, it has been discovered that when a second image target is present, the second harmonic component of the conical-scan envelope contains information concerning the presence of the second target. There is not enough information there to resolve the targets, but if the transmitter is coherent, there will be added information at the output of a frequency discriminator operating on the IF signal. To be specific, it has been discovered that the fundamental and second harmonic components of the conical scan signal out of the discriminator can be used along with the DC, fundamental, and second harmonic of the envelope to obtain estimates of of the angle to the targets. These components can be put into a computer which solves for the angles to the target. In order to perform these computations, the antenna pattern in the main lobe need be specified, as the computer uses the knowledge of the pattern. The computer may then solve n nonlinear equations in n unknowns. The number of equations corresponds to the unknowns of the targets, i.e., angles, amplitudes of signals, and phases of signals. The number of equations also determines the harmonics of the conical scan out of the discriminator and from the envelope detector which must be sent to the computer.

OBJECTS AND SUMMARY OF THE INVENTION

The main object of the invention is to provide radar signal processing and computation methods for tracking a low flying target with an image target present. A further object is to accomplish this main object with conventional signal processing techniques.

These and other objects are achieved in a coherent, conical-scan radar system by processing the IF signal from the radar receiver through an envelope detector to obtain an envelope signal E and through a frequency discriminator to obtain a discriminator signal D, where the IF signal is of the form $A(t) \cos [\omega_o t + \theta(t)]$, and $\omega_o$ is the IF center frequency in radians per second, the signal E is proportional to $A(t)$ and the signal D is proportional to $A(t) d\theta(t)/dt$. In this expression for the IF signal, A is the amplitude of the signal return and $\omega_o$ is the IF center frequency in radians per second. The signal E is squared and low-pass filtered to obtain a DC signal $E_d$ proportional to the energy in the IF signal envelope. The squared signal $E^2$ is multiplied by a reference signal $-\sin \omega_s t$ from a reference signal generator (driven in synchronism with the conical scan of the radar) to obtain a product signal equal to $-E^2 \sin \omega_s t$, where $\omega_s$ is the radar system scanning rate in radians per second. This product signal is low-pass filtered to obtain a DC signal $E_{1s}$ proportional to the first harmonic energy of the envelope signal E. The signals $E_d$ and $E_{1s}$ may then be processed to obtain an estimate of the target azimuth angle $\epsilon_a$ as the ratio of $E_{1s}$ to $a\mu E_d$, where $\mu$ is the "squint" (half cone) angle of the radar scan. The squared signal $E^2$ is multiplied by $-\cos \omega_s t$ and $\cos 2\omega_s t$ to obtain two product signals which are separately filtered to obtain two DC signals $E_{1c}$ and $E_{2c}$ proportional to the energy of the fundamental and second harmonic components of the envelope signal E. The disciminator signal D is multiplied by the envelope signal E, and the product signal L is in turn multiplied by $\sin \omega_s t$ and $-\sin 2\omega_s t$. The resulting products are then low-pass filtered to obtain signals proportional to the amplitudes of the fundamental and second harmonic components of the discriminator signal D. Knowing the antenna pattern in the main lobe of the conical-scan radar system, these signals $E_d$, $E_{1c}$, $E_{2c}$, $L_{1s}$ and $L_{2s}$ are employed in a computer to iteratively solve five equations in five unknowns $\epsilon_{e1}$, $\epsilon_{e2}$, $A_1$, $A_2$ and $\delta$ starting from predetermined initial estimates, and each time substituting computed values for the initial estimates until the difference between output values and the estimates is less than predetermined amounts. The largest of the two elevation angles $\epsilon_{e1}$ and $\epsilon_{e2}$ is then selected for transmission to an antenna elevation servo. An antenna azimuth servo continually receives the signal $\epsilon_a$ produced by the signal processor to maintain a vertical plane passing through the antenna axis on the target.

The iteratively computed values $A_1$ and $A_2$ are continually squared and summed by the computer and the sum is continually transmitted to an automatic gain control (AGC) circuit of the radar receiver. Different sets of equations must be used in the computer for the different conditions of separate antennas for transmitting and receiving and a common antenna for both transmitting and receiving. The derivation of the equations in both cases is the same once dependence on the scan angle of the amplitude and phase of the signal returned from the target and its image is taken into consideration. If the desired tracking accuracy permits, this dependence can be ignored and a separate transmitting antenna assumed in the case of one antenna for transmitting and receiving. In either case, additional accuracy may be achieved by using equations derived with higher orders terms in a senes expansion in order to more closely approximate the modified Bessel functions of the first kind.

The novel features of the invention are set forth with particularity in the appended claims. The invention will best be understood from the following description when read in conjunction with the accompanying drawings.

BRIEF DESCRIPTION OF THE DRAWINGS

FIG. 1a illustrates the geometry of a conical scan radar tracking system with both a target and an image ray present, and FIG. 1b illustrates the geometry of FIG. 1a in a plane perpendicular to the rotation axis of the radar system.

FIGS. 2 through 5 are graphs of loss in estimation accuracy versus squint angle ($\mu$).

FIG. 7 illustrates a block diagram for a signal processor to be used in carrying out the present invention in a radar system with either one antenna for transmitting and receiving, or with separate antennas.

FIG. 8 is a block diagram of a conical scan processor in a radar system having a single antenna for transmitting and receiving.

DESCRIPTION OF THE PREFERRED EMBODIMENTS

Figure 2:
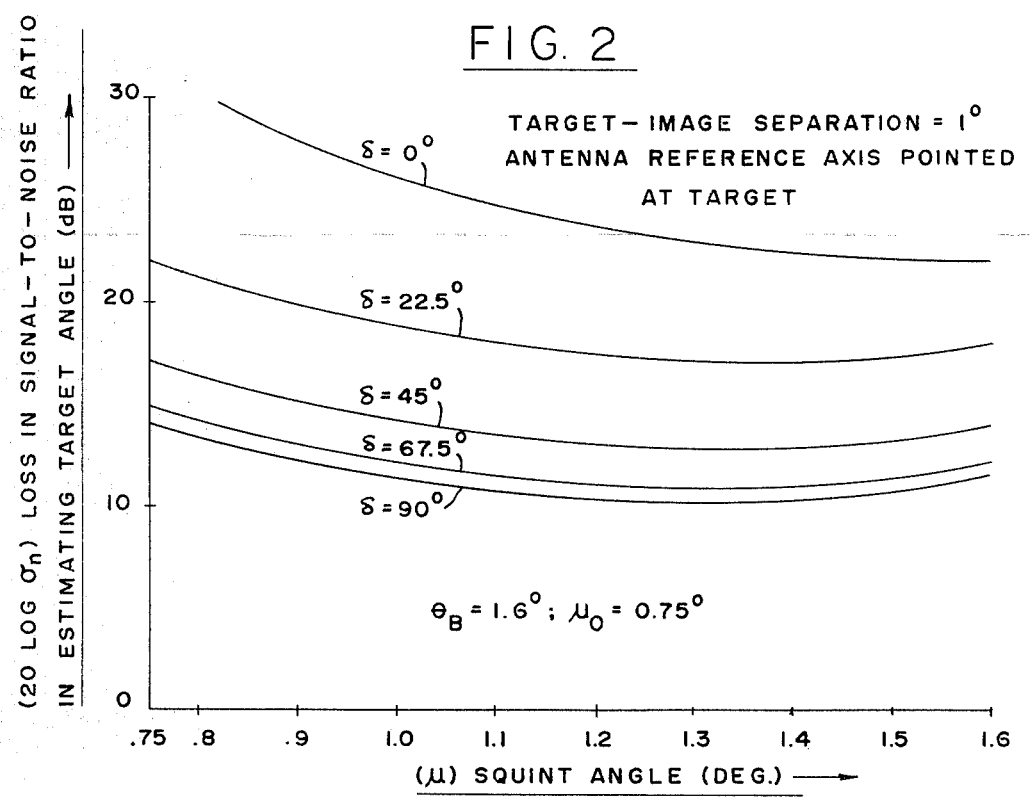

When the image ray 10 from a low-flying target 11 shown in FIG. 1a enters the main beam of a conically scanning antenna 12, normal receiver processing can cause erratic tracking due to the image interference. The IF signal in complex notation, when no noise is present, can be assumed to take the form $$S(t) = A_1 G[\xi^2_1(t)] e^{j\phi_1} + A_2 G[\xi^2_2(t)] e^{j\phi_2} \quad (1)$$

Here, $A_i$ is the amplitude of the $i^{th}$ signal, i.e. the signal returned from the direct ray or its image, $\phi_i$ is the phase of the $i^{th}$ signal, and $G[\xi^2_i(t)]$ is the one-way voltage gain of the conically scanning antenna at the time $t$ when the angle between the antenna axis 13 and the $i^{th}$ signal is $\xi_i(t)$.

The transmission characteristics of the transmitter have been absorbed in the $A_i$ and $\phi_i$ in Equation (1). It is assumed that the $A_i$ and $\phi_i$ are constant over at least one scan period. Because the antenna is scanning, the $A_i$ and $\phi_i$, even for a nonfading target, are slightly dependent on the scan angle $\xi_i(t)$ as it changes in a periodic manner. This slight dependence can be neglected in the present invention if less accuracy can be accepted, or abbreviated if a separate transmitting antenna is used. Accordingly, a separate transmitting antenna is assumed for the present. Also, it is necessary to assume the transmitter is coherent for at least one scan period for the $A_i$ and $\phi_i$ to be constant over this time.

The radar has a short-pulsed transmitter so that the $S(t)$ in Equation (1) are only observed at discrete times $t_k$. However, assuming the pulse repetition rate is large compared to the scan period, the received signal can be assumed to have the form of Equation (1) at all $t$.

The scanning antenna rotates at a fixed rate $\omega_s$ rad/sec about an axis 14 and the antenna axis 13 makes an angle $\mu$ with the axis of rotation as shown in FIGS. 1a and 1b. This angle is called the squint angle from the geometry of the situation it is evident that for $\xi_i(t)$ small (compared to one radian), $$\xi^2_i(t) = \mu^2 + \epsilon^2_{e_i} + \epsilon^2_{a_i} - 2\mu\epsilon_{e_i} \cos\omega_s t - 2\mu\epsilon_{a_i} \sin\omega_s t \quad (2)$$

In Equation (2), $\epsilon_{e_i}$ and $\epsilon_{a_i}$ are the angles the $i^{th}$ signal makes with the axis of rotation in the elevation and azimuth planes, respectively, as shown in FIG. 1b. Equation (2) assumes the antenna axis at $t = 0$ is in the elevation plane, i.e., that the angle $\omega_s t$ of the antenna axis at time $t$ is measured from the elevation plane as shown in FIGS. 1a and 1b. This choice of a reference plane is, however, arbitrary.

Since the two signals correspond to the target and its image ray, it is permissible to assume that the azimuth angle is the same to both. Thus, $$\epsilon_{a_1} = \epsilon_{a_2} = \epsilon_a \quad (3)$$

For purposes of analysis, further assume the antenna has a Gaussian-shaped pattern and is thus given by $$G(\xi^2) = e^{-a\xi^2} \quad (4)$$

The gain at $\xi = 0$ has been absorbed into $A_1$ and $A_2$ in Equation (1). Also $$\sqrt{a} = 1.18/\theta_B \quad (5)$$

where $\theta_B$ is the total one-way 3-dB beamwidth of the antenna.

It will be assumed that additive white noise is present in the signal $S(t)$ in Equation (1). To achieve the present invention, the "best" accuracy with which the angle to the target can be estimated in an unbiased manner is first obtained. It is assumed that the seven parameters $\epsilon_{e_1}, A_1, \phi_1, \epsilon_{e_2}, A_2, \phi_2$ and $\epsilon_a$ are unknown. A processor which will come close to achieving this accuracy can then be used to solve for these unknowns, which can be reduced to five, as will be presently understood.

If the signal-to-noise ratio can be assumed good, then realistic bounds on the minimum variance of unbiased estimates of the seven unknown parameters are given by the Cramer-Rao bound. This is obtained as follows. Let $\alpha_i, i = 1,2,\ldots,7$ be the seven unknown parameters, $\epsilon_{e_1}, A_1, \phi_1, \epsilon_{e_2}, A_2, \phi_2, \epsilon_a$, respectively. Let $T$ be the time of observation of the signal $S(t)$ in Equation (1). It will be assumed that $T$ is an integer number of scan periods. Thus, $$T = 2\pi m/\omega_s \quad (6)$$

where $m$ is a positive integer. Form the 7 × 7 information matrix $I$ with the components $$I_{\alpha_i \alpha_k} = \text{Real} \frac{1}{\sigma^2 T_p} \int_0^T \frac{\partial S(t)}{\partial \alpha_i} \frac{\partial S(t)}{\partial \alpha_k} dt \quad (7)$$

Here, $\sigma^2$ is the variance of the noise out of a filter matched to a pulse width of the signal when the input is the white noise added to $S(t)$ in Equation (1). $T_p$ is the time between pulses transmitted.

Form the inverse matrix of Equation (6), and call the components of this inverse $\sigma^2_{\alpha_i \alpha_k}$. Then the minimum variance unbiased estimate of the parameter $\delta_i$ is given by $\sigma^2_{\alpha_i\alpha_i}$.

Performing the operations in Equation (7), using Equations (1) through (4) and (6), yields (in the case $\epsilon_a = 0$, i.e., in the case of the reference axis actually in the elevation plane of the target and its image) the results shown in Table 1 for $I$.

TABLE 1.—MATRIX I $$\left[T_p\sigma^2 \bigg/ \frac{2\pi m}{\omega_s} e^{-2a\mu^2}\right]^6 I =$$

| | $\epsilon_{e_1}$ | $A_1$ | $\phi_1$ | $\epsilon_{e_2}$ | $A_2$ | $\phi_2$ | $\epsilon_a$ |
|---|---|---|---|---|---|---|---|
| $\epsilon_{e_1}$ | $aA_1^2 P_{\epsilon_{e_1}\epsilon_{e_1}}$ | $\sqrt{a}A_1 P_{A_1\epsilon_{e_1}}$ | 0 | $aA_1A_2 P_{\epsilon_{e_1}\epsilon_{e_2}}$ | $\sqrt{a}A_1 P_{A_2\epsilon_{e_1}}$ | $\sqrt{a}A_1A_2 P_{\phi_2\epsilon_{e_1}}$ | 0 |
| $A_1$ | $\sqrt{a}A_1 P_{A_1\epsilon_{e_1}}$ | $P_{A_1A_1}$ | 0 | $\sqrt{a}A_2 P_{A_1\epsilon_{e_2}}$ | $P_{A_1A_2}$ | $A_2 P_{A_1\phi_2}$ | 0 |
| $\phi_1$ | 0 | 0 | $A_1^2 P_{\phi_1\phi_1}$ | $\sqrt{a}A_1A_2 P_{\phi_1\epsilon_{e_2}}$ | $A_1 P_{A_2\phi_1}$ | $A_1A_2 P_{\phi_1\phi_2}$ | 0 |
| $\epsilon_{e_2}$ | $aA_1A_2 P_{\epsilon_{e_1}\epsilon_{e_2}}$ | $\sqrt{a}A_2 P_{A_1\epsilon_{e_2}}$ | $\sqrt{a}A_1A_2 P_{\phi_1\epsilon_{e_2}}$ | $aA_2^2 P_{\epsilon_{e_2}\epsilon_{e_2}}$ | $\sqrt{a}A_2 P_{A_2\epsilon_{e_2}}$ | 0 | 0 |
| $A_2$ | $\sqrt{a}A_1 P_{A_2\epsilon_{e_1}}$ | $P_{A_1A_2}$ | $A_1 P_{A_2\phi_1}$ | $\sqrt{a}A_2 P_{A_2\epsilon_{e_2}}$ | $P_{A_2A_2}$ | 0 | 0 |
| $\phi_2$ | $\sqrt{a}A_1A_2 P_{\phi_2\epsilon_{e_1}}$ | $A_2 P_{A_1\phi_2}$ | $A_1A_2 P_{\phi_1\phi_2}$ | 0 | 0 | $A_2^2 P_{\phi_2\phi_2}$ | 0 |
| $\epsilon_a$ | 0 | 0 | 0 | 0 | 0 | 0 | $P_{\epsilon_a\epsilon_a}$ |

 = Matrix $I_1$

Here the $P\sigma_i\sigma_j$ are defined as follows.

$$P_{\epsilon_{e_1}\epsilon_{e_1}} = (2\mu^2 + 4\epsilon_{e_1}^2)\, aL_1 - 8\mu\epsilon_{e_1}aM_1 + 2\mu^2 aN_1$$

$$P_{A_1\epsilon_{e_1}} = -2\epsilon_{e_1}\sqrt{a}L_1 + 2\mu\sqrt{a}M_1$$

$$P_{\epsilon_{e_1}\epsilon_{e_2}} = (4\epsilon_{e_1}\epsilon_{e_2} + 2\mu^2)\, aL_3 \cos\delta - 4\mu(\epsilon_{e_1}+\epsilon_{e_2})\, aM_3 \cos\delta$$

$$P_{A_2\epsilon_{e_1}} = -2\epsilon_{e_1}\sqrt{a}L_3 \cos\delta + 2\mu\sqrt{a}M_3 \cos\delta$$

$$P_{\phi_2\epsilon_{e_1}} = 2\epsilon_{e_1}\sqrt{a}L_3 \sin\delta - 2\mu\sqrt{a}M_3 \sin\delta$$

$$P_{A_1A_1} = L_1$$

$$P_{A_1\epsilon_{e_2}} = -2\epsilon_{e_2}\sqrt{a}L_3 \cos\delta + 2\mu\sqrt{a}M_3 \cos\delta$$

$$P_{A_1A_2} = L_3 \cos\delta$$

$$P_{A_1\phi_2} = -L_3 \sin\delta$$

$$P_{\phi_1\phi_1} = L_1$$

$$P_{\phi_1\epsilon_{e_2}} = -2\epsilon_{e_2}\sqrt{a}L_3 \sin\delta + 2\mu\sqrt{a}M_3 \sin\delta$$

$$P_{A_2\phi_1} = L_3 \sin\delta$$

$$P_{\phi_1\phi_2} = L_3 \cos\delta$$

$$P_{\epsilon_{e_2}\epsilon_{e_2}} = (2\mu^2 + 4\epsilon_{e_2}^2)\, aL_2 - 8\mu\epsilon_{e_2}aM_2 + 2\mu^2 aN_2$$

$$P_{A_2\epsilon_{e_2}} = -2\epsilon_{e_2}\sqrt{a}L_2 + 2\mu\sqrt{a}M_2$$

$$P_{A_2A_2} = L_2$$

$$P_{\phi_2\phi_2} = L_2$$

$$P_{\epsilon_a\epsilon_a} = \frac{4\pi a^2\mu^2 m e^{-2a\mu^2}}{\sigma^2\omega_s T_p}\, [A_1^2(L_1+N_1) + A_2^2(L_2+N_2) + 2A_1A_2(L_3+N_3)\cos\delta]$$

(8)

(9)

Here, $$\delta = \phi_2 - \phi_1$$

$$L_1 = e^{-2a\epsilon_{e_1}^2}I_0(4\mu a\epsilon_{e_1})$$

$$L_2 = e^{-2a\epsilon_{e_2}^2}I_0(4\mu a\epsilon_{e_2})$$

$$L_3 = e^{-a\epsilon_{e_1}^2-a\epsilon_{e_2}^2}I_0[2\mu a(\epsilon_{e_1}+\epsilon_{e_2})]$$

$$M_1 = e^{-2a\epsilon_{e_1}^2}I_1(4\mu a\epsilon_{e_1})$$

$$M_2 = e^{-2a\epsilon_{e_2}^2}I_1(4\mu a\epsilon_{e_2})$$

$$M_3 = e^{-a\epsilon_{e_1}^2-a\epsilon_{e_2}^2}I_1[2\mu a(\epsilon_{e_1}+\epsilon_{e_2})]$$

$$N_1 = e^{-2a\epsilon_{e_1}^2}I_2(4\mu a\epsilon_{e_1})$$

$$N_2 = e^{-2a\epsilon_{e_2}^2}I_2(4\mu a\epsilon_{e_2})$$

$$N_3 = e^{-a\epsilon_{e_1}^2-a\epsilon_{e_2}^2}I_2[2\mu a(\epsilon_{e_1}+\epsilon_{e_2})]$$

Here, $I_n(.)$ are the modified Bessel functions of the first kind, where $$I_2(x) = I_0(x) - (2I_1(x)/x) \qquad (10)$$

From Table 1, it is evident that $\epsilon_a$ is uncoupled from all the other parameters because of the zeros in the last row and column. This implies that the variance of the estimate of the common azimuth angle of the direct and image ray is given by $$\sigma^2_{\epsilon_a\epsilon_a} = 1/P_{\epsilon_a\epsilon_a} \qquad (11)$$

where $P_{\epsilon_a\epsilon_a}$ is obtained from Equations (8) and (9).

Generally, it is of more concern as to what the variance is on the estimate of the elevation angle of the target. From the symmetry of the problem, we can take the variance on $\epsilon_e$ as that of the target. Since $\epsilon_a$ is uncoupled from all the other parameters, Table 1 shows that it is necessary to invert the 6 × 6 Matrix $I_1$ shown in solid lines in order to obtain $\sigma^2_{\epsilon_{a1}\epsilon_{a1}}$. Thus, from Table 1 we have $$\sigma^2_{\epsilon_{e_1}\epsilon_{e_1}} = \frac{|M|\,\omega_s T_p \sigma^2 e^{2a\mu^2}}{|I_1|\,2\pi m} \qquad (12)$$

In Equation (12), $|I_1|$ is the determinant corresponding to the matrix in solid lines, while $|M|$ is the determinant formed by eliminating the first column and first row of $I_1$.

An examination of matrix $I_1$ in Table 1 shows that $A_1$ can be removed as a common factor from each row and column headed by $\epsilon_{e1}$ and $\phi_1$, while $A_2$ can be removed as a common factor from each row and column headed by $\epsilon_{e2}$ and $\phi_2$. Furthermore, $\sqrt{a}$ can be removed as a common factor from each row and column headed by $\epsilon_{e1}$ and $\epsilon_{e2}$.

Let $\tilde{I}_1$ be the matrix formed from $I_1$ in Table 1 by setting $A_1 = A_2 = \sqrt{a} = 1$, and let $\tilde{M}$ be the matrix formed by eliminating the first row and column of $\tilde{I}_1$. Then the above discussion implies $$|I_1| = a^2 A_1^4 A_2^4 |\tilde{I}_1| \qquad (13)$$

$$|M| = a A_1^2 A_2^4 |\tilde{M}| \qquad (14)$$

Thus, from Equations (12), (13), and (14) the following variance is obtained.

$$\sigma^2_{\epsilon_{e_1}\epsilon_{e_1}} = \frac{\omega_s T_p \sigma^2 e^{2a\mu^2}}{2\pi m a A_1^2}\,\frac{|\tilde{M}|}{|\tilde{I}_1|} \qquad (15)$$

If the image were not present, then the variance on the estimate of the elevation position of the target would be found by inverting the 3 × 3 matrix which is in the upper left-hand corner of $I_1$ in Table 1. The upper left-hand corner of the inverted matrix would then be the minimum variance on an unbiased estimate of $\epsilon_{e1}$. Performing this procedure for the case $\epsilon_{e1} = 0$, the following minimum variance is obtained for when the image is not present $$\sigma^2_0 = \frac{\omega_s T_p \sigma^2 e^{2a\mu_0^2}}{2\pi m a A_1^2}\cdot\frac{1}{2a\mu_0^2} \qquad (16)$$

In Equation (16), the value of $\mu$ is labeled $\mu_0$ in order to consider the squint angle $\mu$ as a parameter to be optimized when the image is present. Thus $\mu_0$ will represent a reference squint angle (such as the one which minimizes the variance of the angle estimate when the image is not present).

From Equations (15) and (16)

$$\sigma_n^2 = \frac{\sigma_{\epsilon_1 \epsilon_1}^2}{\sigma_0^2} = 2a\mu_0^2 e^{2a\mu^2 - \mu_0^2} \frac{|\tilde{M}|}{|\tilde{I}|} \quad (17)$$

Thus $\sigma_n^2$ is the minimum variance unbiased estimate of the elevation angle of the target when the image is present, normalized to the minimum variance unbiased estimate of the angle when the image is not present and the target is on the reference (rotation) axis. It can also be thought of as the effective loss in signal-to-noise ratio in estimating the target angle.

By use of a computer, Table 1, the definitions of $M$ and $I$ in Equation (17), and Equations (8) and (9), the normalized variance can be found in Equation (17). If the 3-dB beamwidth of the antenna is specified, then Equation (5) can be used to obtain $a$. This has been done for the case of interest, namely, $\theta_B = 1.6°$ and $\mu_0 = 0.75°$.

Curves have been plotted for this case in FIGS. 2 through 5, inclusive. If all angles on these curves were normalized to the beamwidth $\theta_B$, the resultant curves would hold for any size of antenna.

In FIG. 2 $\sigma_n^2$ is plotted in decibels as a function of $\mu$ for a target image separation of 1°. This is the minimum separation at which the system must meet specifications. The results are a function of $\delta$, i.e., the electrical path length (phase) difference ($\phi_2 - \phi_1$) between the target and image ray. However, they are symmetric with respect to 0° and ±90°. Thus they need only be plotted for $0° \leq \delta \leq 90°$, which has been done in all four FIGS. 2 through 5.

Figure 3:
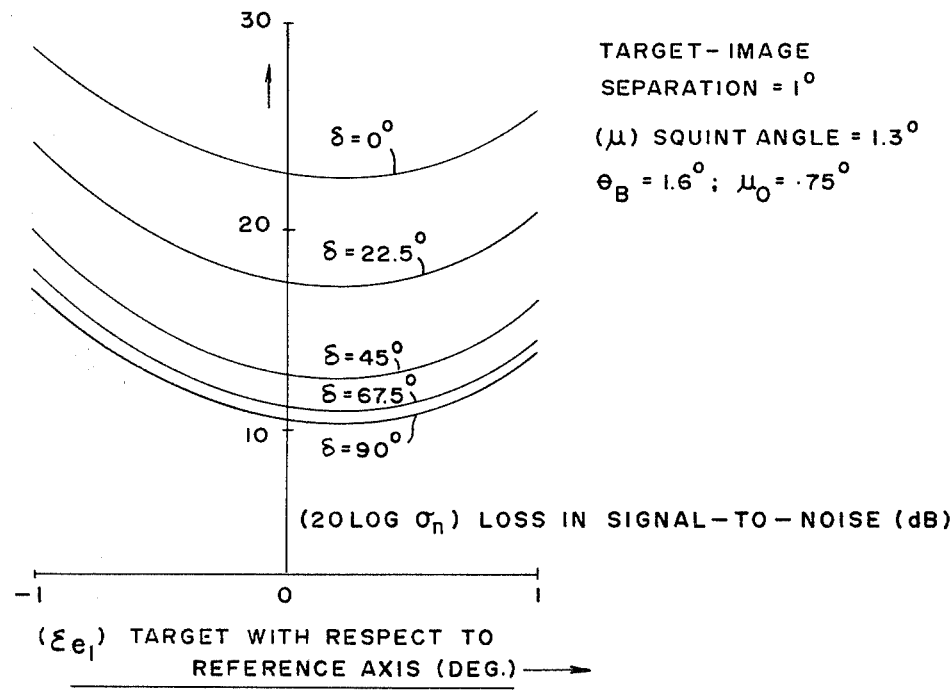

For the majority of cases in FIG. 2, the optimum squint angle to use is in the vicinity of 1.3°. Also, in this figure the target was placed along the reference axis, i.e., $\epsilon_{e1} = 0$. In FIG. 3 is plotted the estimation accuracy versus the target position with respect to the reference axis for the case $\mu = 1.3°$. It can be seen that the minimum accuracy loss occurs in the vicinity of the reference axis but is quite flat. A positive value of $\epsilon_{e1}$ in FIG. 3 corresponds to the reference axis lying between the target and its image.

In FIG. 4 are plots analogous to FIG. 2 for a target-image separation of 1.5°. It can be seen that at this larger separation the losses are smaller than for the 1° case. Similarly, in FIG. 5 are plots for a separation of 0.5°. In this case, the losses are larger than for the 1° case.

Next consider a processor to perform the estimation of the target angle when the image is present. For good signal-to-noise ratio, which is the situation of concern, the maximum likelihood detector will achieve the performance indicated in FIGS. 2 to 5. However, in order to use conventional hardware, a different approach is taken in accordance with the present invention.

The IF signal is normally envelope detected in a receiver, so this signal is available. If a frequency discriminator without a limiter is employed for operation on the IF, its output can also be used since the transmitter is coherent. These two signals will have components at DC, $\omega_s$, and, in general, all the harmonics of $\omega_s$. The lower harmonics will contain most of the information in the signal, since the higher-order harmonics will contain higher-order terms of the angles to be estimated and will thus be more easily corrupted by noise. Therefore the method of the present invention uses as many of the lower harmonic outputs as are needed to define a set of equations, in the noise-free case, which is sufficient to solve for the unknowns in Equation (1).

The envelope of the signal is obtained from Equation (1) as $$E = |S(t)| = |A_1 G[\xi_1^2(t)] + A_2 G[\xi_2^2(t)]e^{j\delta}| \quad (18)$$

If the output of the discriminator without the limiter is represented by $D$, then $$L = DE = ]RE\, S(t)] \, d/dt \, [Im\, S(t)] - [Im\, S(t)] \, d/dt \, [Re\, S(t)] \quad (19)$$

Using Equation (1), the following equation is obtained from Equation (19).

$$L = A_1 A_2 \xi_2^2 G(\xi_1^2)[dG(\xi_2^2)/d\xi_2^2]\sin\delta - A_1 A_2 \xi_1^2 G(\xi_2^2)[dG(\xi_1^2)/d\xi_1^2]\sin\delta$$

Using Equations (2) and (3), it is evident that Equations (18) and (20) are functions of the six unknowns, $A_1$, $A_2$, $\epsilon_{e1}$, $\epsilon_{e2}$, $\epsilon_a$, and $\delta$. Therefore six equations are needed to solve for them. By using Equations (2), (3), and (4) in Equations (18) and (20), it is possible to expand $E^2$ and $L$ into a harmonic series, i.e., $$\left. \begin{array}{l} E^2 = E_d + \sum_{i=1}^{\infty} (E_{ic} \cos i\omega_s t + E_{is} \sin i\omega_s t) \\[10pt] L = L_d + \sum_{i=1}^{\infty} (L_{ic} \cos i\omega_s t + L_{is} \sin i\omega_s t) \end{array} \right\} \quad (21)$$

Doing this and retaining up to second-order terms in the angles, it is found that six equations needed to solve for the unknowns are obtained from $E_d$, $E_{1s}$, $E_{1c}$, $E_{2c}$, $L_{1s}$, and $L_{2s}$. Furthermore, it has been discovered that $E_{1s}/a\mu E_d$ is a good estimate of $\epsilon_a$ when a separate antenna is used for transmitting and receiving, so that it is used in the equations associated with $E_d$, $E_{1c}$, $E_{2c}$, $L_{1s}$, and $L_{2s}$ to solve for the remaining five unknowns $A_1$, $A_2$, $\epsilon_{e1}$, $\epsilon_{e2}$, and $\delta$, thus reducing the number of equations needed from five to six.

The processor described above is shown in FIG. 6, while the five equations in five unknowns are contained in Table 2. The larger of the angles $\epsilon_{e1}$ and $\epsilon_{e2}$ at the output of the computer can be taken as the angle to the target, since the target is above the image. A simple comparator can be provided to make that choice. The computer itself may be implemented as an analog computer, or as a digital computer if the input signals are in digital form, or are converted at the input to the computer into digital form. In either case, the implementation shown in FIG. 6 assumes a signal processor 20 implemented in accordance with FIG. 7, and a computer 21 for iteratively carrying out the computations of the equations in Table 2. It is further assumed that the computer includes means for forming the sum $A_1^2 + A_2^2$ for AGC control and a comparator to select the larger of the angles $\epsilon_{e1}$ and $\epsilon_{e2}$ for the elevation servo control.

TABLE 2.

THE FIVE EQUATIONS IN COMPUTER IN FIVE UNKNOWNS ($\epsilon_{e_1}, \epsilon_{e_2}, A_1, A_2, \delta$)

$E_d = A^2_1 + A^2_2 + 2A_1A_2\cos\delta + \epsilon^2_a(4A^2_1\mu^2a + 2A^2_1 + 4A^2_2\mu^2a + 2A^2_2 + 8A_1A_2\mu^2a\cos\delta + 4A_1A_2\cos\delta) + \epsilon^2_{e_1}$
$a(4A^2_1\mu^2a + 2A^2_1 + 2A_1A_2\mu^2a\cos\delta + 2A_1A_2\cos\delta) + 4A_1A_2\mu^2a^2\epsilon_{e_1}\epsilon_{e_2}\cos\delta + \epsilon^2_{e_2}a(4A^2_2\mu^2a + 2A^2_2 + 2A_1A_2\mu^2a\cos\delta + 2A_1A_2\cos\delta)$
$E_{1c} = 2A^2_1\mu a\epsilon_{e_1} + 2A^2_2\mu a\epsilon_{e_2} + 2A_1A_2\mu a\cos\delta(\epsilon_{e_1} + \epsilon_{e_2})$
$E_{2c} = 2A^2_1\mu^2a^2\epsilon^2_{e_1} + 2A^2_2\mu^2a^2\epsilon^2_{e_2} + A_1A_2\mu^2a^2(\epsilon_{e_1} + \epsilon_{e_2})^2\cos\delta - 2A^2_1\mu^2a^2\epsilon^2_a - 2A^2_2\mu^2a^2\epsilon^2_a - 4A_1A_2\mu^2a^2\epsilon^2_a\cos\delta$
$L_{1s} = aA_1A_2\mu\omega_s(\epsilon_{e_1} - \epsilon_{e_2})\sin\delta$
$L_{2s} = a^2A_1A_2\mu^2\omega_s(\epsilon^2_1 - \epsilon^2_e)\sin\delta$ ANTENNA HAS ONE-WAY VOLTAGE PATTERN $G(\xi) = e^{-a\xi^2}$; $\mu$ IS SQUINT ANGLE OF THE CONICAL SCAN ; $\epsilon_a$ IS AZIMUTH ANGLE OF DIRECT AND IMAGE RAY ; $\epsilon_{e_1}, \epsilon_{e_2}$ ARE ELEVATION ANGLES OF DIRECT AND IMAGE RAY.

Figure 6:
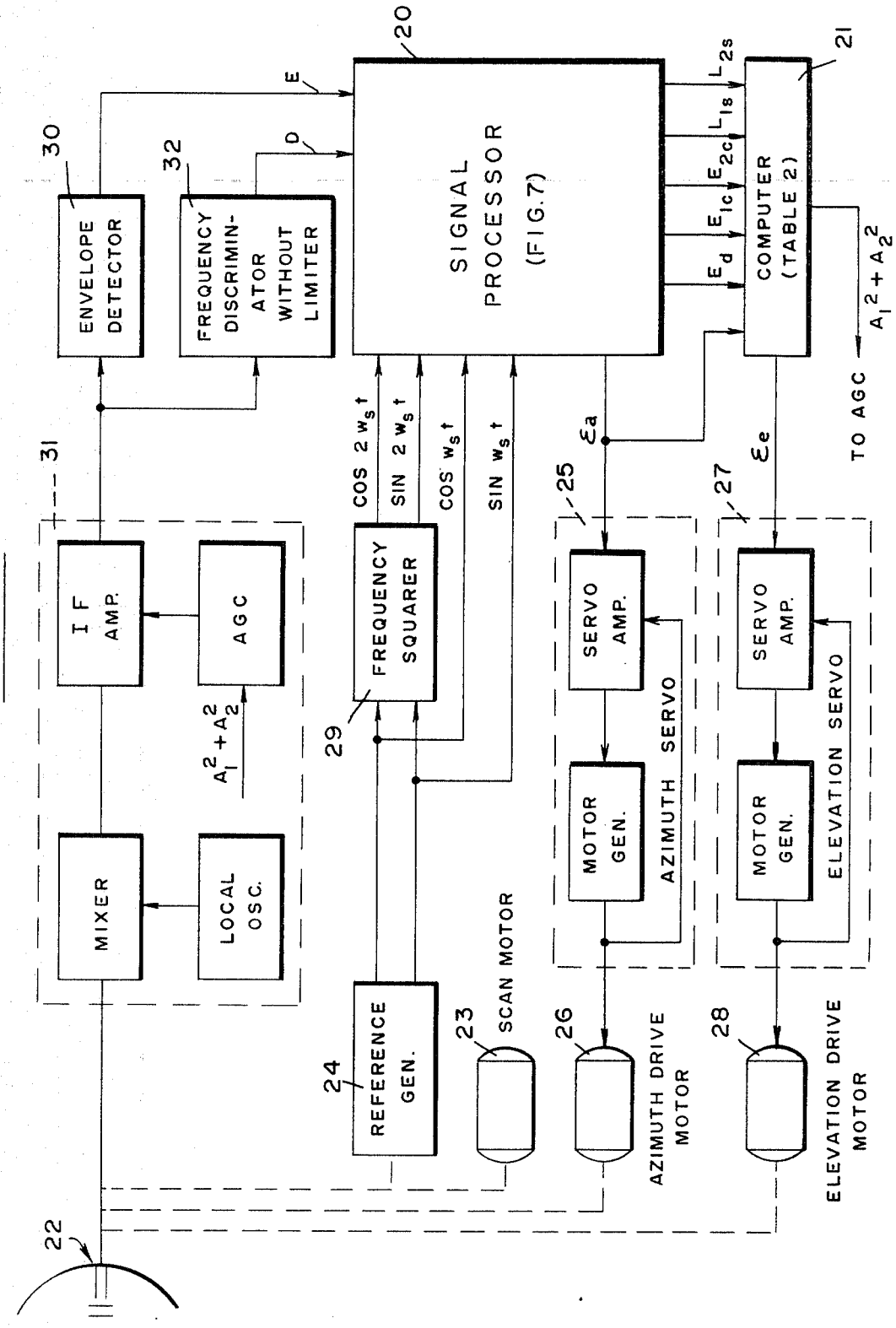
FIG. 6 is a block diagram of a conical scan processor in a radar system having separate transmitting and receiving antennas to track a target when an image is present in accordance with the present invention.

The embodiment of FIG. 6 assumes a separate antenna (not shown) for transmission, although it may have only the antenna 22 shown for both transmitting and receiving. A scan motor 23 drives an antenna to rotate its boresight axis about a reference (rotation) axis at the constant rate $\omega_s$. It also drives a reference generator 24 to produce two reference signals $\sin \omega_s t$ and $\cos \omega_s t$ for use in the signal processor 20. An output $\epsilon_a$ from the signal processor drives the rotation axis in azimuth, through a servo 25 and a motor 26 while the output $\epsilon_e$ from the computer 21 drives the rotation axis in elevation through a servo 27 and motor 28.

The computer receives as inputs the signals $\epsilon_a$, $E_d$, $E_{1c}$, $E_{2c}$, $L_{1s}$ and $L_{2s}$ from the signal processor to solve the equations of Table 2 for: $A_1$ and $A_2$ combined in the AGC signal; $\epsilon_{e1}$ and $\epsilon_{e2}$ from which the output $\epsilon$ is selected and $\delta$ used only in the computer. To generate the inputs to the computer, the signal processor 20 receives the reference signals $\sin \omega_s t$ and $\cos \omega_s t$ and through a frequency squarer 29 the reference signals $\sin 2\omega_s t$ and $\cos 2\omega_s t$. It also receives signals D and E. The latter is the output from an envelope detector 30 which receives the IF signal from the radar receiver 31 in a conventional manner. A frequency discriminator without limiter 32 receives the IF signal and produces the signal D. The IF signal is of the form $A(t) \cos [\omega_o t + \theta(t)]$. Therefore E is proportional to $A(t)$ while D is proportional to $A(t)d\theta(t)/dt$.

Referring now to FIG. 7, the signal processor receives the signals E and D, and the reference signals, and uses as many of the lower harmonics of the two signals as are needed to define a set of equations sufficient to solve for the unknowns in Equation (1). If the output E of the detector 30 (FIG. 6) is as given by Equation (18), the output of a mixer 36 (FIG. 7) is given by Equation (19). A squarer 37 produces the signal $E^2$, which with the signal L makes it possible to provide the harmonic series of Equation (21). The output of the squarer is transmitted through a low-pass filter 38 to provide the input $E_d$ to the computer 21 of the form represented by the first of the five equations in Table 2.

The signal $E^2$ is multiplied by a signal $-\sin \omega_s t$ in a mixer 39, and the product is transmitted through a low-pass filter 41 to produce a signal $E_{1s}$ which, when divided by $2\mu E_d$ in a divider 41 yields a good estimate of the azimuth error $E_a$. That error signal is transmitted to the computer 21, as noted hereinbefore. However, it should be noted that since the azimuth error has no image ray interference, it can be computed in the conventional manner, or in any other convenient way.

To complete the inputs to the computer 21, the signal $E^2$ is multiplied by $-\cos \omega_s t$ and $\cos 2\omega_s t$ in respective mixers 42 and 43, and the respective products are transmitted through low-pass filters 44 and 45 to provide the signals $E_{1c}$ and $E_{2c}$ of the form represented by the second and third equations of Table 2. Similarly, the signal L from the mixer 36 is multiplied by $\sin \omega_s t$ and $-\sin 2\omega_s t$ in mixers 46 and 47, and the respective products are transmitted through low-pass filters 48 and 49 to provide the signals $L_{1s}$ and $L_{2s}$ of the form represented by the fourth and fifth equations of Table 2. All six inputs are then used in the computer to solve the equations of Table 2 for the unknowns. Phase inverters (not shown) are used to obtain the negative signs where needed for the sine and cosine reference signals used by the signal processor in producing these input signals to the computer.

In operation the computer of FIG. 6 is programmed to iteratively solve the equations of Table 2 using as initial estimates the following values.

$A_1 = 0.7$
$A_2 = 0.7$
$\epsilon_{e1} = 0$
$\epsilon_{e2} = -0.1/\sqrt{a}$
$\delta = 90°$ After the first computation, each iteration employs as the "initial condition" the values just computed. Therefore, the values computed during each iteration replace the previous estimates for the next iteration. This process is continued at a fast rate to bring the reference axis on the target. The iteration is completed once the outputs are obtained to the following accuracy.

$\Delta A_1 = .07$
$\Delta A_2 = .07$
$\Delta \epsilon_{e1} = .01/\sqrt{a}$
$\Delta \epsilon_{e2} = .01/2\sqrt{a}$
$\Delta \delta = 10°$ Referring now to FIG. 8, a second embodiment of a conical scan processor is shown for tracking a target when an image ray is present in a coherent pulsed radar system using a single antenna 50 for both transmitting and receiving radar pulses. A conventional duplexer 51 connects the antenna to a transmitter 52 and isolates the receiver 53 during transmission. Between transmission periods, the receiver accepts return signals and produces an IF signal. As in the case of the first embodiment, the fundamental and second harmonic components of the IF signal can be used along with the DC, fundamental and second harmonic of the envelope to obtain estimates of the angle to the target. These components are processed in a processor 54 and computer 55 to solve for the azimuth and elevation angles to the target. The signal processor is implemented as shown in FIG. 7 for the first embodiment. The difference between the two embodiments is that in this second one the computer is programmed to solve the five equations of Table 3 for the five unknowns $E_{e1}$, $E_{e2}$, $A_1$, $A_2$ and $\delta$.

TABLE 3

THE FIVE EQUATIONS IN COMPUTER IN FIVE UNKNOWNS $$(\epsilon_{e1}, \epsilon_{e2}, A_1, A_2, \delta)$$

$$E_d = A_1^4 e^{4a\epsilon_{e1}^2} I_0(8a\mu\epsilon_{e1}) + A_2^4 e^{4a\epsilon_{e2}^2} I_0(8a\mu\epsilon_{e2}) + 2A_1^2 A_2^2 \cos 2\delta e^{-2a\epsilon_{e1}^2 - 2a\epsilon_{e2}^2} I_0(4a\mu\epsilon_{e1} + 4a\mu\epsilon_{e2})$$
$$+ 4A_1^3 A_2 \cos \delta e^{-3a\epsilon_{e1}^2 - a\epsilon_{e2}^2} I_0(6a\mu\epsilon_{e1} + 2a\mu\epsilon_{e2}) + 4A_1 A_2^3 \cos \delta e^{-a\epsilon_{e1}^2 - 3a\epsilon_{e2}^2} I_0(2a\mu\epsilon_{e1} + 6a\mu\epsilon_{e2})$$

$$E_{1_c} = A_1^4 e^{-4a\epsilon_{e1}^2} I_1(8a\mu\epsilon_{e1}) + A_2^4 e^{-4a\epsilon_{e2}^2} I_1(8a\mu\epsilon_{e2}) + 2A_1^2 A_2^2 \cos 2\delta e^{-2a\epsilon_{e1}^2 - 2a\epsilon_{e2}^2} I_0(4a\mu\epsilon_{e1} + 4a\mu\epsilon_{e2})$$
$$+ 4A_1^3 A_2 \cos \delta e^{-3a\epsilon_{e1}^2 - a\epsilon_{e2}^2} I_1(6a\mu\epsilon_{e1} + 2a\mu\epsilon_{e2}) + 4A_1 A_2^3 \cos \delta e^{-a\epsilon_{e1}^2 - 3a\epsilon_{e2}^2} I_1(2a\mu\epsilon_{e1} + 6a\mu\epsilon_{e2})$$

$$E_{2_c} = A_1^4 e^{-4a\epsilon_{e1}^2} I_2(8a\mu\epsilon_{e1}) + A_2^4 e^{-4a\epsilon_{e2}^2} I_2(8a\mu\epsilon_{e2}) + 2A_1^2 A_2^2 \cos 2\delta e^{-2a\epsilon_{e1}^2 - 2a\epsilon_{e2}^2} I_2(4a\mu\epsilon_{e1} + 4a\mu\epsilon_{e2})$$
$$+ 4A_1^3 A_2 \cos \delta e^{-3a\epsilon_{e1}^2 - a\epsilon_{e2}^2} I_2(6a\mu\epsilon_{e1} + 2a\mu\epsilon_{e2}) + 4A_1 A_2^3 \cos \delta e^{-a\epsilon_{e1}^2 - 3a\epsilon_{e2}^2} I_2(2a\mu\epsilon_{e1} + 6a\mu\epsilon_{e2}))$$

$$L_{1_s} = 4a^2\mu^2\omega_s A_1 A_2 e^{-a\epsilon_{e1}^2 - a\epsilon_{e2}^2} \epsilon_a(\epsilon_{e1} - \epsilon_{e2}) \sin \delta [I_0(2a\mu\epsilon_{e1} + 2a\mu\epsilon_{e2}) - I_2(2a\mu\epsilon_{e1} + 2a\mu\epsilon_{e2})]$$

$$L_{2_s} = 4a^2\mu^2\omega_s A_1 A_2 e^{-a\epsilon_{e1}^2 - a\epsilon_{e2}^2} \epsilon_a(\epsilon_{e1} - \epsilon_{e2}) \sin \delta [I_1(2a\mu\epsilon_{e1} + 2a\mu\epsilon_{e2}) - I_3(2a\mu\epsilon_{e1} + 2a\mu\epsilon_{e2})]$$

Antenna has one-way voltage pattern $G(\xi)=G_0 e^{-a}$; $\mu$ is squint angle of the conical scan; $\epsilon_a$ is azimuth angle of direct and image ray; $\epsilon_{e1}, \epsilon_{e2}$ are elevation angles of direct and image ray; $I_n(\cdot)$ is the modified Bessel function of the first kind of order $n$.

The azimuth angle $\epsilon_a$ is calculated as in the first embodiment through the signal processor of FIG. 7, as is the input $E_d$ to the computer 55. The other inputs $E_{1c}$, $E_{2c}$, $L_{1s}$, and $L_{2s}$ to the computer are also calculated as in the first embodiment through the signal processor of FIG. 7. The calculated azimuth angle $\epsilon_a$ is applied to an azimuth servo to control an azimuth drive motor. The difference then is how the elevation angle $\epsilon_e$ is calculated by the computer 55 to drive an elevation servo 64 that controls an elevation drive motor 65. However, this difference is not one of concept, or of basic principles in the derivation of the five equations in five unknowns, but simply one of taking into account the dependence of the amplitude and phase of the signal returned from the target and its image on the scan angle when a single antenna is used.

Another difference illustrated by the set of five equations in Table 3 is the derivation of equations using the exact functions which are the modified Bessel functions $I_n(\cdot)$ of the first kind, where $n$ is the order of the function from 0 to 2. However, this further difference is not one of concept either since both sets of equations in Tables 2 and 3 are derived in a strictly analogous manner.

The received signal may be a CW or pulsed radar signal in the first case, but only a pulsed radar signal in the second case (FIG. 8). In the second case, several pulses are required from the target during each revolution. In both cases there is amplitude modulation at the scan frequency, and maximum amplitude occuring when the scanning antenna beam is closest to the target or the image. What is more important is that in both cases the low harmonics of the conical scan out of a discriminator and envelope detector are used to resolve two targets when the signal to noise ratio is high. The target having the algebraically larger angle is selected as the real target.

As noted hereinbefore, the exact form of the equations in the computer will depend upon the antenna pattern $G(\xi)^2$. The foregoing analysis assumes a Gaussian-shaped pattern given by Equation (4). If the pattern does not have that shape, but has some other known symmetrical shape, the function defining that shape would be substituted into Equations (18) and (20) instead of that of Equation (4). The harmonic series would then be obtained in Equation (21) using the resulting functions of Equations (18) and (20). The unknowns would still be obtained from the six equations associated with $E_d$, $E_{1s}$, $E_{1c}$, $E_{2c}$, $L_{1s}$, and $L_{2s}$.

When the transmitting and receiving antenna are the same (FIG. 8) the form of the return signal is (taking account of the scanning motion of the transmitter during transmit)

$$S(t) = \{A_1 G[\xi_1^2(t)]e^{j\phi_1} + A_2 G[\xi_2^2(t)]e^{j\phi_2}\}^2 \quad (22)$$

Substituting this form of $S(t)$ into Equations (18) and (19), the envelope E and discriminator output L can be found in manner analogous to that used to obtain Equations (18) and (20) for the case (FIG. 6) where separate antennas are used for transmitting and receiving. Again assume $G(\xi)^2$ has a Gaussian shape as in Equation (4). A harmonic series as in Equation (21) is then performed and the resultant functional forms of the six equations needed to solve for the unknowns are again obtained from $E_d$, $E_{1s}$, $E_{1c}$, $E_{2c}$, $L_{1s}$, and $L_{2s}$. Furthermore, it has been discovered in this case that $E_{1s}/2a\mu E_d$ is a good estimate of $\epsilon_a$, so that it is used in the equations associated with $E_d$, $E_{1c}$, $E_{2c}$, $L_{1s}$, and $L_{2s}$ to solve for the remaining five unknowns $A_1$, $A_2$, $\epsilon_{e1}$, $\epsilon_{e2}$, and $\delta$. The resulting five equations are those shown in Table 3. In performing the harmonic series for this case, the higher-order terms in the angles were not dropped. This accounts for the appearance of the $I_n(\cdot)$ which are the modified Bessel functions of order n. If the pattern $G(\xi)^2$ does not have the Gaussian shape as indicated in Equation (4), but has some other known symmetrical shape, then the harmonic series in Equation (21) can still be obtained in the manner just discussed.

What is claimed is:

1. A method for target ray resolution in coherent, conically scanned radar when a target image is present, using a radar with a known symmetrical pattern comprised of:

receiving a radar return signal, and processing said return signal through an envelope detector to obtain a signal E, and through a frequency discriminator to obtain a signal D, where said return signal is of the form $A(t) \cos[\omega_o t + \theta(t)]$ in which form $\omega_o$ is the center frequency of said return signal in radians per second, said signal E is proportional to $A(t)$ and said signal D is proportional to $A(t) \, de(t)/dt$;

squaring said signal E to obtain a signal $E^2$ proportional to $[A(t)]^2$;

passing said signal $E^2$ through a low-pass filter to obtain a DC signal $E_d$ proportional to the energy in said signal E;

multiplying said signal E by said signal D to obtain a product signal L;

generating reference signals $\sin \omega_s t$ and $\cos \omega_s t$ in synchronism with the conical scan of said radar, where $\omega_s$ is the radar system scanning rate in radians per second;

squaring said reference signals to obtain addition reference signals $\sin 2\omega_s t$ and $\cos 2\omega_s t$;

multiplying said signal $E^2$ by said signal $\sin \omega_s t$, inverted, to obtain a signal $-E^2 \sin \omega_s t$;

passing said signal $-E^2 \sin \omega_s t$ through a low-pass filter to obtain a signal $E_{1s}$ proportional to the first harmonic energy of said signal E;

using said signals $E_d$ and $E_{1s}$ to obtain an estimate of the target azimuth angle $\epsilon_a$ as the ratio of the signal $E_{1s}$ to $\mu E_d$ times a constant K, where $\mu$ is the half-cone angle of the radar scan;

multiplying said signal $E^2$ by said signal $\cos \omega_s t$ inverted to obtain a signal $-E^2 \cos \omega_s t$ and by said signal $\cos 2\omega_s t$ to obtain a signal $E^2 \cos 2\omega_s t$;

passing said signals $-E^2 \cos \omega_s t$ and $E^2 \cos 2\omega_s t$ through separate low-pass filters to obtain two signals $E_{1c}$ and $E_{2c}$ proportional to the energy of the fundamental and second harmonic components, respectively of the signal E;

multiplying said signal L by said signal $\sin \omega_s t$ to obtain a signal $L \sin \omega_s t$ and by said signal $\sin 2\omega_s t$ inverted to obtain a signal $-L \sin 2\omega_s t$;

passing said signals $L \sin \omega_s t$ and $-L \sin 2\omega_s t$ through separate low-pass filters to obtain two signals $L_{1s}$ and $L_{2s}$ proportional to the amplitudes of the fundamental and second harmonic components, respectively, of said signal D;

using a known function of said antenna pattern, and the assumption that the azimuth angle of the target and the target image are equal, programming a computer to use said signals $E_d$, $E_{1c}$, $E_{2c}$, $L_{1s}$ and $L_{2s}$ to solve five equations in five unknowns $A_1$, $A_2$, $\epsilon_{31}$, $\epsilon_{e2}$ and $\delta$, where $A_1$ and $A_2$ are the amplitudes of the target, and target image return signals $\epsilon_{e1}$ and $\epsilon_{e2}$ are the elevation angles of the target and target image, and $\delta$ is the phase difference between the target and target image signals; and selecting the largest of said two elevation angles $\epsilon_{e1}$ and $\epsilon_{e2}$ as the elevation angle $\epsilon_e$ of the target.

2. A method as defined in claim 1 wherein said computer is programmed to iteratively solve said five equations in five unknowns starting from initial estimates of the unknowns, and after each iteration substituting computed values of said five unknowns for the initial estimates until the differences between output values and the last estimates have been reduced to predetermined amounts.

3. A method as defined in claim 2 wherein said conically scanned radar is employed for target tracking through azimuth and elevation servos by continually outputting said signal $\epsilon_a$ to said azimuth servo and continually outputting to said elevation servo said largest of said two elevation angles as a signal proportional to $\epsilon_e$ when said difference has been reduced to said predetermined amounts.

4. A method as defined in claim 3 wherein said radar is provided with automatic gain control by continually outputting a signal proportional to the sum of the squares of said computed values $A_1$ and $A_2$ when said difference has been reduced to said predetermined amounts.

5. A method as defined in claim 1 wherein said radar receives energy from an antenna separate from an antenna used for transmitting energy and said antenna has a known pattern of symmetrical shape with a function $G(\xi^2)$, and wherein said five equations said computer is programmed to solve are derived by using $$\epsilon_{e1} = \epsilon_{e2} = \epsilon_a$$
$$\xi^2_i(t) = \mu^2 + \epsilon^2_{e_i} + \epsilon^2_{a_i} = 2\mu\epsilon_{e_i}\cos\omega_s t - 2\mu\epsilon_{a_i}\sin\omega_s t$$

in the following equations $$E = |S(t)| = |A_1 G[\xi^2_1(t)] + A_2 G[\xi^2_2(t)] \, e^{j\delta}|$$
$$L = A_1 A_2 \xi^2_2 G(\xi^2_1)[dG(\xi^2_2)/d\xi^2_2]\sin\delta - A_1 A_2 \xi^2_1 G(\xi^2_2)[dG(\xi^2_1)/d\xi^2_2]\sin\delta$$

together with the known function of the antenna pattern to expand $E^2$ and L from these equations into a harmonic series, i.e., $$E^2 = E_d + \sum_{i=1}^{\infty} (E_{ic} \cos i\omega_s t + E_{is} \sin i\omega_s t)$$

$$L = L_d + \sum_{i=1}^{\infty} (L_{ic} \cos i\omega_s t + L_{is} \sin i\omega_s t)$$

retaining up to second order terms in the angles, to obtain six equations in six unknowns $E_d$, $E_{1s}$, $E_{1c}$, $E_{2c}$, $L_{1s}$ and $L_{2s}$, and using said signal $\epsilon_a$ as an estimate of target azimuth in the five equations associated with $E_d$, $E_{1c}$, $E_{2c}$, $L_{1s}$ and $L_{2s}$ to solve for the remaining five unknowns $A_1$, $A_2$, $\epsilon_{e1}$, $\epsilon_{e2}$, and $\delta$.

6. A method as defined in claim 5 wherein said five equations said computer is programmed to solve are as follows:

$$E_d = A^2_1 + A^2_2 + 2A_1 A_2 \cos\delta + \epsilon^2_a(4A^2_1\mu^2 a + 2A^2_1 + 4A^2_2\mu^2 a + 2A^2_2 + 8A_1 A_2 \mu^2 a\cos\delta + 4A_1 A_2 \cos\delta) + \epsilon^2_{e_1} a(4A^2_1\mu^2 a + 2A^2_1 + 2A_1 A_2 \mu^2 a\cos\delta + 2A_1 A_2 \cos\delta) + 4A_1 A_2 \mu^2 a^2 \epsilon_{e_1} \epsilon_{e_2} \cos\delta + \epsilon^2_{e_2} a(4A^2_2\mu^2 a + 2A^2_2 + 2A_1 A_2 \mu^2 a\cos\delta + 2A_1 A_2 \cos\delta)$$

$$E_{1c} = 2A^2_1 \mu a \epsilon_{e_1} + 2A^2_2 \mu a \epsilon_{e_2} + 2A_1 A_2 \mu a \cos\delta(\epsilon_{e_1} + \epsilon_{e_2})$$

$$E_{2c} = 2A^2_1 \mu^2 a^2 \epsilon^2_{e_1} + 2A^2_2 \mu^2 a^2 \epsilon^2_{e_2} + A_1 A_2 \mu^2 a^2 (\epsilon_{e_1} + \epsilon_{e_2})\cos\delta - 2A^2_1 \mu^2 a^2 \epsilon^2_a - 2A^2_2 \mu^2 a^2 \epsilon^2_a - 4A_1 A_2 \mu^2 a^2 \epsilon^2_a \cos\delta$$

$$L_{1s} = aA_1 A_2 \mu \omega_s (\epsilon_{e_1} - \epsilon_{e_2})\sin\delta$$
$$L_{2s} = a^2 A_1 A_2 \mu^2 \omega_s (\epsilon^2_{e_1} - \epsilon^2_{e_2})\sin\delta$$

when said antenna has a Gaussian shape.

7. A method as defined in claim 6 wherein said constant K is equal to $a$, and $a$ is the same coefficient $a$ in the Gaussian shaped pattern function $$G(\xi) = e^{-a\xi^2}$$

8. A method as defined in claim 1 wherein said radar receives from the same antenna used to transmit and said antenna has a known pattern of symmetrical shape with a function $G(\xi^2)$, and wherein said five equations said computer is programmed to solve are derived by using $$\epsilon_{e1} = \epsilon_{e2} = \epsilon_a$$
$$\xi^2_i(t) = \mu^2 + \epsilon^2_{e_i} + \epsilon^2_{a_i} - 2\mu\epsilon_{e_i}\cos\omega_s t - 2\mu\epsilon_{a_i}\sin\omega_s t$$

in the following equations $$E = \{A_1 G[\xi^2_1(t)] e^{j\phi_1} + A_2 G[\xi^2_2(t)] e^{j\phi_2}\}^2$$
$$L = A_1 A_2 \xi^2_2 G(\xi^2_1)[dG(\xi^2_2)/d\xi^2_2]\sin\delta - A_1 A_2 \xi^2_1 G(\xi^2_2)[dG(\xi^2_1)/d\xi^2_1]\sin\delta$$

together with the known function of the antenna pattern to expand $E^2$ and $L$ from these equations into a harmonic series, i.e., $$E^2 = E_d + \sum_{i=1}^{\infty} (E_{ic} \cos i\omega_s t + E_{is} \sin i\omega_s t)$$

$$L = L_d + \sum_{i=1}^{\infty} (L_{ic} \cos i\omega_s t + L_{is} \sin i\omega_s t)$$

retaining up to second order terms in the angles to obtain six equations in six unknowns $E_d$, $E_{1s}$, $E_{1c}$, $E_{2c}$, $L_{1s}$ and $L_{2s}$, and using said signal $\epsilon_a$ as an estimate of target azimuth in the five equations associated with $E_d$, $E_{1c}$, $E_{2c}$, $L_{1s}$ and $L_{2s}$ to solve for the remaining five unknowns $A_1$, $A_2$, $\epsilon_{e1}$, $\epsilon_{e2}$, and $\delta$.

9. A method as defined in claim 8 wherein said five equations said computer is programmed to solve are as follows:

$$E_d = A_1^4 e^{-4a\epsilon_{e_1}^2} I_0(8a\mu\epsilon_{e_1}) + A_2^4 e^{-4a\epsilon_{e_2}^2} I_0(8a\mu\epsilon_{e_2}) + 2A_1^2 A_2^2 \cos 2\delta\, e^{-2a\epsilon_{e_1}^2 - 2a\epsilon_{e_2}^2} I_0(4a\mu\epsilon_{e_1} + 4a\mu\epsilon_{e_2})$$
$$+ 4A_1^3 A_2 \cos\delta\, e^{-3a\epsilon_{e_1}^2 - a\epsilon_{e_2}^2} I_0(6a\mu\epsilon_{e_1} + 2a\mu\epsilon_{e_2}) + 4A_1 A_2^3 \cos\delta\, e^{-a\epsilon_{e_1}^2 - 3a\epsilon_{e_2}^2} I_0(2a\mu\epsilon_{e_1} + 6a\mu\epsilon_{e_2})$$

$$E_{1c} = A_1^4 e^{-4a\epsilon_{e_1}^2} I_1(8a\mu\epsilon_{e_1}) + A_2^4 e^{-4a\epsilon_{e_2}^2} I_1(8a\mu\epsilon_{e_2}) + 2A_1^2 A_2^2 \cos 2\delta\, e^{-2a\epsilon_{e_1}^2 - 2a\epsilon_{e_2}^2} I_0(4a\mu\epsilon_{e_1} + 4a\mu\epsilon_{e_2})$$
$$+ 4A_1^3 A_2 \cos\delta\, e^{-3a\epsilon_{e_1}^2 - a\epsilon_{e_2}^2} I_1(6a\mu\epsilon_{e_1} + 2a\mu\epsilon_{e_2}) + 4A_1 A_2^3 \cos\delta\, e^{-a\epsilon_{e_1}^2 - 3a\epsilon_{e_2}^2} I_1(2a\mu\epsilon_{e_1} + 6a\mu\epsilon_{e_2})$$

$$E_{2c} = A_1^4 e^{-4a\epsilon_{e_1}^2} I_2(8a\mu\epsilon_{e_1}) + A_2^4 e^{-4a\epsilon_{e_2}^2} I_2(8a\mu\epsilon_{e_2}) + 2A_1^2 A_2^2 \cos 2\delta\, e^{-2a\epsilon_{e_1}^2 - 2a\epsilon_{e_2}^2} I_2(4a\mu\epsilon_{e_1} + 4a\mu\epsilon_{e_2})$$
$$+ 4A_1^3 A_2 \cos\delta\, e^{-3a\epsilon_{e_1}^2 - a\epsilon_{e_2}^2} I_2(6a\mu\epsilon_{e_1} + 2a\mu\epsilon_{e_2}) + 4A_1 A_2^3 \cos\delta\, e^{-a\epsilon_{e_1}^2 - 3a\epsilon_{e_2}^2} I_2(2a\mu\epsilon_{e_1} + 6a\mu\epsilon_{e_2})$$

$$L_{1s} = 4a^2 \mu^2 \omega_s A_1 A_2 e^{-a\epsilon_{e_1}^2 - a\epsilon_{e_2}^2} \epsilon_a (\epsilon_{e_1} - \epsilon_{e_2}) \sin\delta\, [I_0(2a\mu\epsilon_{e_1} + 2a\mu\epsilon_{e_2}) - I_2(2a\mu\epsilon_{e_1} + 2a\mu\epsilon_{e_2})]$$

$$L_{2s} = 4a^2 \mu^2 \omega_s A_1 A_2 e^{-a\epsilon_{e_1}^2 - a\epsilon_{e_2}^2} \epsilon_a (\epsilon_{e_1} - \epsilon_{e_2}) \sin\delta\, [I_1(2a\mu\epsilon_{e_1} + 2a\mu\epsilon_{e_2}) - I_3(2a\mu\epsilon_{e_1} + 2a\mu\epsilon_{e_2})]$$

when said antenna has a Gaussian shape.

10. A method as defined in claim 9 wherein said constant $K$ is equal to $2a$ where $a$ is the same coefficient $a$ as in the Gaussian shaped pattern function $$G(\xi) = e^{-a\xi^2}$$

* * * * *